(12) United States Patent
Clark

(10) Patent No.: US 6,339,695 B1
(45) Date of Patent: Jan. 15, 2002

(54) CORDLESS PHONE DATA TRANSFER

(75) Inventor: John M. Clark, Fort Worth, TX (US)

(73) Assignee: RadioShack Corporation, Fort Worth, TX (US)

( * ) Notice: Subject to any disclaimer, the term of this patent is extended or adjusted under 35 U.S.C. 154(b) by 0 days.

(21) Appl. No.: 09/305,607

(22) Filed: May 5, 1999

(51) Int. Cl.[7] ................................. H04Q 7/32
(52) U.S. Cl. ................ 455/41; 455/410; 455/462; 455/517; 455/561; 340/7.2
(58) Field of Search .................. 455/41, 550, 462, 455/464, 517, 561, 412, 410; 340/7.2, 7.21, 7.24

(56) References Cited

U.S. PATENT DOCUMENTS

| 4,071,714 A | * | 1/1978 | Satoh | 455/41 |
|---|---|---|---|---|
| 4,593,155 A | * | 6/1986 | Hawkins | 455/462 |
| 4,639,549 A | * | 1/1987 | Hirayama et al. | 455/464 |
| 4,669,109 A | * | 5/1987 | Le Cheviller et al. | 455/462 |
| 5,717,558 A | * | 2/1998 | Lynn et al. | 455/462 |
| 5,956,626 A | * | 9/1999 | Kaschke et al. | 455/462 |

* cited by examiner

*Primary Examiner*—William Trost
*Assistant Examiner*—Keith Ferguson
(74) *Attorney, Agent, or Firm*—William A. Linnell

(57) ABSTRACT

A method and apparatus for transferring identification codes using magnetic coupling. A matching code is established by a microprocessor and is stored in the memories of a communications base unit and a mobile unit. When the mobile unit is placed in the base unit the central processing unit sends pulsed current to a coil in the base unit inducing a magnetic field. A Hall effect transistor in the mobile unit detects the induced changes in the magnetic field and transmits the pulse pattern to the base unit (handset) memory where it is entered as a new identification code.

18 Claims, 2 Drawing Sheets

CORDLESS PHONE DATA TRANSFER

TECHNICAL FIELD OF THE INVENTION

The present invention relates to an apparatus and method for programming an authentication code, or identification code, to be used between a base station and a mobile station in a communication system. It is an object of the present invention to provide an improved authentication check method and apparatus which renders false signals or manipulation, either intentional or unintentional, less likely. The base station unit provides identification code information to the mobile units without the need for modifying the handset or base. The proposed method and apparatus can also be applied to other mobile communications systems such as paging systems.

BACKGROUND OF THE INVENTION

There are a variety of communication systems in which one or more mobile units communicate with a central base station unit. Examples of such systems include mobile telephone systems, garage door openers and remote computer terminals. In such systems, each mobile unit must communicate only with one base unit, and similarly, each base unit must communicate only with a specified group of mobile units.

"Cordless" telephones include a hand held unit or "handset" which looks much like a telephone but includes a duplex radio link with a base station. The base station is hard wired to a standard telephone line. Communication is established between the base station and the handset either upon initiation of a call by the handset user, or an incoming telephone call received over the telephone line by the base unit. The handset typically includes batteries which are recharged by placing the handset in the base station.

Only a relatively small portion of the radio spectrum has been allocated to cordless telephones and these telephones operate on a selected band of a relatively few channels. The frequency a particular telephone uses is usually made permanent by hardwiring or by setting a switch which may or may not be readily accessible by the user. Typically, the base unit and the handset are permanently set to the same frequency. Because of the small number of channels available, it is possible a person will select the same channel on his cordless telephone as another user, especially in a relative dense urban or suburban area. This results in interference and can lead to unauthorized use of a cordless telephone by allowing unauthorized users to gain access to another user's telephone. To prevent unauthorized use, it is common to employ a security code in cordless telephone systems.

Numerous systems for providing such security have been developed and typically involve storing an electronic identification code in both the base unit and the mobile units and then checking for corresponding codes prior to establishing a communications link. A simple means for establishing security is to send a tone through the transmitter to the receiver and if the appropriate tone is detected, communication is established. A variety of code storage techniques have been developed including providing the units with hardwired circuitry for generating a code, providing each unit with a removable programmable identification storage "code plug", or providing each unit with memory circuitry into which a user manually enters a code.

Each of these methods has drawbacks. For example, the use of hard-wired circuitry to generate a code requires each unit to be individually wired in a unique manner greatly increasing manufacturing costs. Code plugs must be uniquely programmed prior to installation and generally only a relatively few user-selected codes are available in order to avoid excessive manufacturing costs. Because relatively few identification codes are available, there is an increased likelihood that other users could accidentally or intentionally select the same codes, thereby compromising the security of the communication system. Also, if a purchaser desires either a new base unit or mobile unit for use in an existing system, it is necessary for either the manufacturer or the purchaser to assure that the unit obtained contains the proper code for allowing communication with other units of the system.

The present invention generates a random identification code and stores the identification code in the internal RAM of the microprocessor of the base unit. The identification code is transmitted to the handset unit by varying the current flow through a coil in the base unit in proportion to the identification code. As the current flows through the coil the magnetic flux density surrounding the coil also varies. A magnetic flux detector in the handset detects the change in flux density and sends this information to a microprocessor in the handset, thus establishing a new identification code.

Thus, matching a specific base unit and a specific mobile unit is no longer done manually, but automatically each time a mobile unit is replaced on the base unit. In addition, code matching is performed frequently because recharging the battery in the handset is done periodically and placing the handset in the base unit automatically triggers the identification code transfer process. A further advantage of the present invention is it is possible to change either the base unit or handset without trying to match existing permanent identification codes in advance.

The utility of this invention is not limited to cordless telephones. Paging systems have a base station and a plurality of pager receivers for receiving signals sent from the base station. These pager receivers have their own identification codes allotted. Upon the generation of a call request to any pager receiver, the base station inserts a corresponding identification code into the paging signal and transmits it. Each time the pager receiver receives a paging signal, it compares the identification code of the paging signal with their own initially stored identification codes for identification. If there is a match, an audible alert is produced, informing the owner of the pager receiver that there is a call. By storing each pager's code separately in memory when the pager is recharged, the code for each pager can be changed independent of the other pagers or it can be the same for all.

SUMMARY OF THE INVENTION

In view of the foregoing it is a general object of the present invention to provide a new and improved electronic system wherein a base station unit communicates with one or more mobile units.

According to the teachings of this invention, a novel identification code transmission system for communications devices of the type having a base station unit and at least one mobile unit is disclosed including: means for generating an identification code in said base unit; means for storing said identification code in said base unit; means for storing said identification code in said mobile unit; and means for transmitting via magnetic coupling said identification code from said base unit to means for detecting the transmitted identification code in said mobile unit and storing it in said means for storing said identification code in said mobile unit.

An identification code transmission system is disclosed wherein said transmission system further includes sensing means for sensing when said mobile unit is proximate to said base unit and wherein said magnetic coupling means comprises a means for measuring Hall effect. It is a further object of this invention to have a telephone communications base unit and a cordless telephone handset.

In one embodiment of the invention there is a base station unit having an identification code generator, an identification code memory in said base unit, and at least one mobile unit with an identification code memory in said mobile unit and a transmitter for sending said identification code from said base unit identification code memory to said identification code memory wherein said transmitter varies the magnetic flux of said mobile unit when the mobile unit is proximate the base unit.

It is an object of this invention to practice a method for transmitting identification codes for electronic message transmission systems of the type having a base unit, with electronic memory, and one or more mobile units, with electronic memory by: selecting an identification code in said base unit; replacing any existing identification code(s) in said base unit memory; and transmitting the identification code from the base unit to the mobile unit by means of magnetic flux. The identification code may be produced by using a random number generator to generate said identification code and a Hall effect transistor may be used to receive said magnetically transmitted identification code.

Various other purposes and advantages of the invention will become clear from its description in the specification that follows. It will be understood that the invention is not limited to the precise embodiment disclosed below and that alternative embodiments and methods will be readily apparent to those skilled in the art without departing from the spirit and scope of the invention as defined in the claims.

DISCLOSURE OF THE INVENTION

The present invention is directed to a method and apparatus for transferring an identification code from a base station unit to any compatible mobile handset when the mobile handset is mated with the base unit such as during battery charging or storage. This invention provides an apparatus and method of automatically transferring a mutual matching identification code between a base station unit and one or more cordless handsets, or similar mobile units.

Any compatible mobile unit may be used with any base station without the need for manually altering circuit components or manually programming the mobile unit. A user may program as many or as few mobile units as desired. To make a connection between a cordless handset and the cordless base station the transmitted identification code received at the receiver to be compared with stored identification codes. Only when a match in the identification code occurs between the receiver's identification code and the sender's identification code, are communications established.

In the case of a cordless telephone system for instance, an authentication check is carried out before a connection is made between the mobile telephone and the base station. Either the handset or base station may initiate the connection. The base station interrogates the mobile telephone for a code to confirm its identity. The handset reveals its identity to the base station, confirming that the handset is authorized to send a call through the base station. The identification code can be sent from the base to one or more handsets within the area covered by the base station. All further transmissions are preceded by an identification code to provide additional security.

Figure 1:
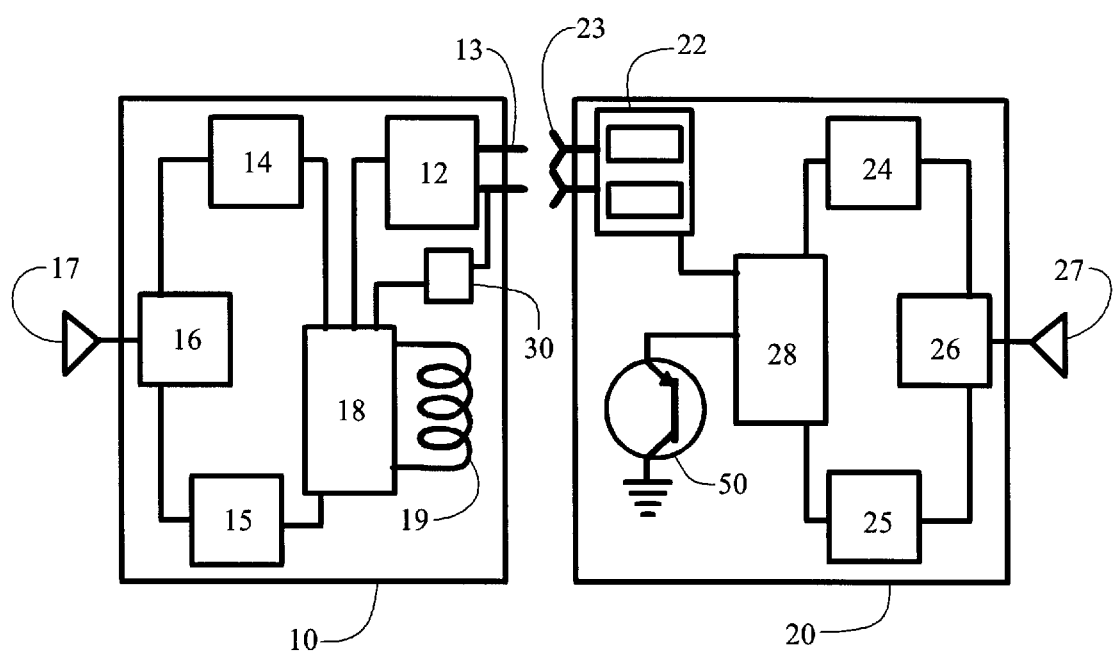
FIG. 1. Is a block diagram depicting a cordless telephone constructed in accordance with the present invention.

FIG. 1 is a block diagram depicting one embodiment of a cordless telephone incorporating the teachings of this invention. A cordless telephone system includes base unit 10 and handset 20. Base unit 10 and handset 20 communicate by sending data such as control signals, security codes, and analog or digital voice signals via radio frequency (RF) transmissions. Handset 20 is powered by batteries 22, which are recharged by placing the handset 20 in the base unit 10 to allow battery charger 12 to provide battery charging current to handset 20 when handset 20 is physically placed in a cradle within base unit 10 making contact between connectors 23 and prongs 13, respectively.

Base unit 10 includes receiver 14 and transmitter 15, which are coupled on their RF side through duplexer 16 to antenna 17. This allows receiver 14 and transmitter 15 to operate on different frequencies utilizing a common antenna 17. Receiver 14 and transmitter 15 are controlled by base unit microcontroller 18. Base unit microcontroller 18 serves to monitor the telephone line (not shown) which is connected to the base unit 10. When an incoming call is detected, base unit microcontroller 18 initiates communication with handset 20 sending control signals and security codes to transmitter 15. Similarly, base unit microcontroller 18 receives signals from receiver 14 which were transmitted by handset 20. By providing signals to transmitter 15 and receiving signals from receiver 14, base unit microcontroller 18 controls the operation of base unit 10 for incoming calls, and calls generated by handset 20.

Base unit 10 also includes battery charging circuit 12. Battery charging circuit 12 serves to provide the appropriate amount of voltage and current to handset 20 for recharging battery 22 when handset 20 is placed in base unit 10. Battery charging circuit 12 typically receives its power from an AC source (not shown) used to supply power to base unit 10. Battery charging circuit 12 provides battery charging current via prongs 13 inserted in connector 23 in handset 20. In accordance with the teachings of this invention, battery charging circuit 12 connects to sensor 30 which in turn is connected to base unit microcontroller 18. Sensor 30 serves to provide a signal to base microcontroller 18 indicating that the handset is in the base cradle for charging.

Handset 20 includes receiver 24 tuned to the frequency of transmitter 15 of base unit 10. Handset 20 also includes transmitter 25 tuned to the frequency of receiver 14 of base unit 10. The RF side of receiver 24 and transmitter 25 are coupled through duplexer 26 to common antenna 27. Handset 20 includes handset microcontroller 28 which communicates control signals with receiver 24, and control signals with transmitter 25 and battery 22 for mobile operation. Although not shown, handset 20 typically includes a microphone, speaker, and a keypad handset. Handset microcontroller 28 serves to evaluate signals received by receiver 24 and provide signals via transmitter 25 so that base unit 10 and handset 20 communicate with each other only when appropriate control signals are sent and the security code provided by base unit 10 matches the security code provided by handset 20.

Charging circuit 12 serves to charge battery 22 when handset 20 is placed in base unit 10 and thus charging circuit 12 is connected to the handset 20 via prongs 13 and connectors 23. In accordance with the teachings of this invention, sensor 30 is utilized in order to detect when handset 20 is placed in base unit 10. Circuit 30 provides a signal to base unit microcontroller 18 when battery charging connection is made via connector 23. Handset 20 includes a magnetic flux detector 50, such as the Hall effect device described in U.S. Pat. No. 4,134,030 to Pace, which is incorporated herein by reference. The flux detector 50 generates an electrical output signal upon exposure to a magnetic field which is transmitted to the handset microcontroller 28 for storage in memory.

Figure 2:
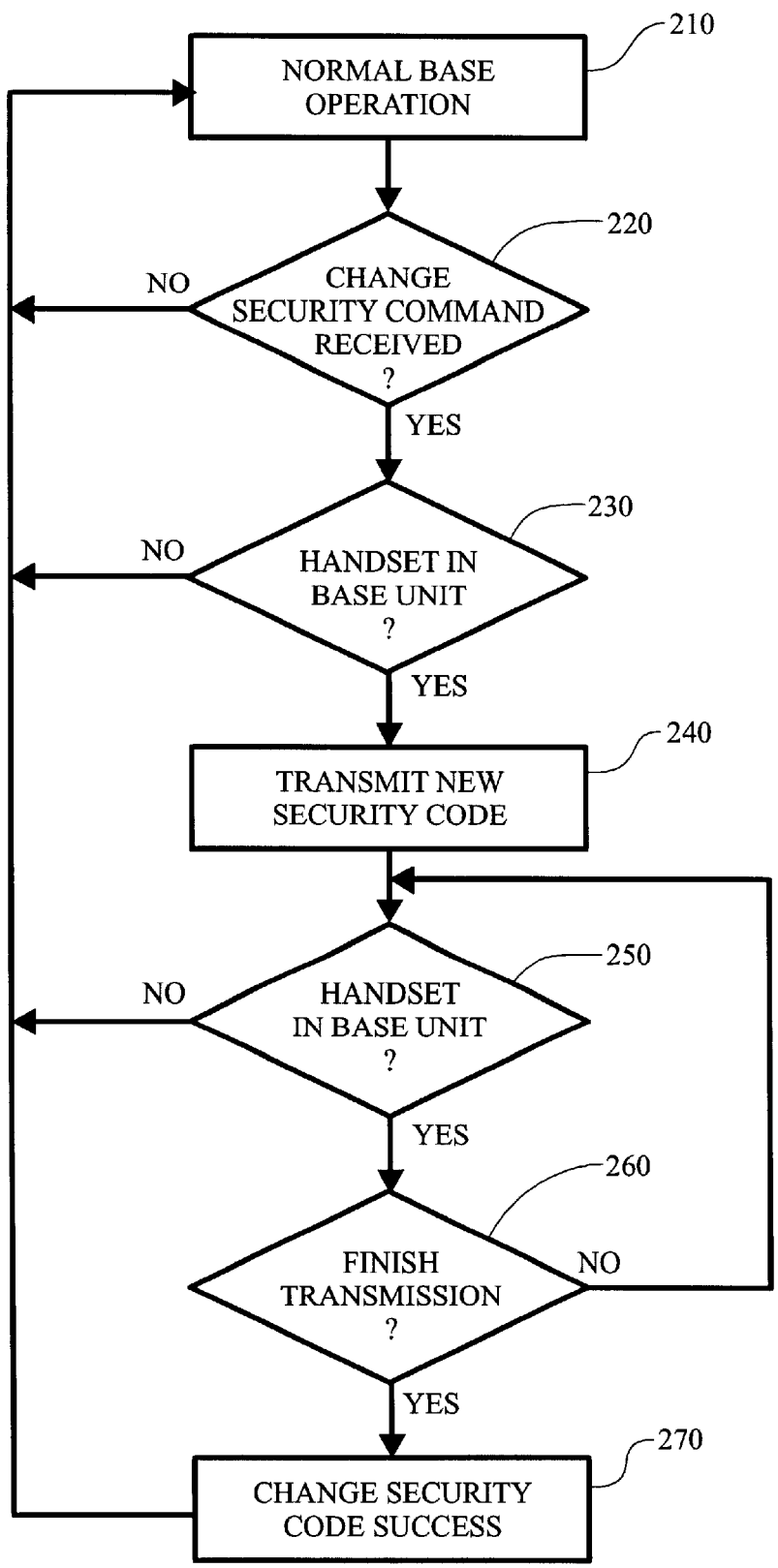
FIG. 2 Is a flow chart depicting the transfer of identification codes using magnetic coupling in accordance with the present invention.

Referring to FIG. 2, at step 210 the base station is performing its normal operations. At step 220 the program determines if the identification code is to be changed. The identification code can be changed randomly, whenever the handset is placed in the base unit, or at fixed intervals based on the base unit's 10 internal clock. Once the determination has been made to change the identification code the program checks to determine if the handset 20 is in the base unit 10, step 230. If the handset 20 is not in the base unit 10, the program returns to 210 and begins again. If the handset 20 is in the base unit 10 the new security code is transmitted in step 240. At step 250 the program checks to see the handset 20 was not removed during the transmission of step 240. If the handset is still in the base unit the success code flag is set and the program returns to normal operation 210.

Although the present invention has been described in terms of a cordless telephone system having a base station connected to a telephone line and a mobile handset, the invention is applicable to any system in which multiple mobile units must be individually identified so they can be distinguished from each other. These included, but are not limited to, systems in which there is communication between the base station and the mobile unit such as two-way mobile radios (i.e., walkie talkies) and one-way paging systems as well as systems in which there is no communication between the base station and the mobile units such as badge entry systems. Although the mobile unit has been described in terms of being battery operated, it only needs to be powered when it is receiving the identification code from the base station at which time it would receive its power from the base station.

The inventive method and apparatus is characterized by the claims as set forth below. It will be understood that the invention is not limited to the precise embodiment disclosed below and that alternative embodiments and methods will be readily apparent to those skilled in the art without departing from the spirit and scope of the invention as defined in the claims.

I claim:

1. An identification code transmission system for communications devices of the type having a base station unit and at least one mobile unit comprising:

means for generating an identification code in said base unit;

means for storing said identification code in said base unit;

means for storing said identification code in said mobile unit; and means for encoding said identification code as variations in magnetic flux in said base unit;

means for measuring Hall effect in said mobile unit, and wherein said means for measuring Hall effect is aligned with the magnetic flux produced by said means for encoding and is operable to detect and couple said identification code to said means for storing in said mobile unit.

2. An identification code transmission system as defined in claim 1 wherein said transmission system further includes sensing means for sensing when said mobile unit is proximate to said base unit.

3. An identification code transmission system as defined in claim 1 wherein said means for measuring Hall effect is a Hall effect transistor.

4. An identification code transmission system as defined in claim 1 wherein said base unit is a means for telephone communications base unit and said mobile unit is a cordless telephone handset.

5. An identification code transmission system as defined in claim 1 wherein said base unit is a means for pager communications base unit and said mobile unit is a pager.

6. An identification code transmission system as defined in claim 1 wherein said base unit is a radio transceiver base unit and said mobile unit is a radio transceiver.

7. An identification code transmission system for use in systems of the type having a base station unit and at least one mobile unit comprising:

means for generating an identification code in said base unit;

means for storing said identification code in said base unit;

means for storing said identification code in said mobile unit;

means for encoding said identification code as variations in magnetic flux in said base unit;

means for measuring Hall effect in said mobile unit, and wherein said means for measuring Hall effect is aligned with the magnetic flux produced by said means for encoding and is operable to detect and couple said identification code to said means for storing in said mobile unit, and means for sensing when said mobile unit is proximate to said base unit thereby activating said means for encoding.

8. An identification code transmission system for use in electronic message transmission systems of the type having a base station unit and at least one mobile unit comprising:

an identification code generator in said base unit;

an identification code detector in said moble unit;

identification code memory in said base unit;

identification code memory in said mobile unit; and a transmitter for sending said identification code from said base unit identification code memory to said mobile unit identification code memory wherein said transmitter varies magnetic flux, and said identification code detector senses magnetic flux according to Hall effect.

9. An identification code transmission system as defined in claim 8 wherein said encoding system farther includes a sensor to determine when said mobile unit is proximate to said base unit.

10. An identification code transmission system as defined in claim 8 wherein said identification code detector is a Hall effect transistor for determing changes in magnetic flux of the base unit.

11. An identification code transmission system as defined in claim 8 wherein said base unit is a telephone communications base unit and said mobile unit is a cordless telephone handset.

12. An identification code transmission system as defined in claim 8 wherein said base unit is a means for pager communications base unit and said mobile unit is a pager.

13. An identification code transmission system as defined in claim 8 wherein said base unit is a radio transceiver base unit and said mobile unit is a radio transceiver.

14. An identification code transmission system for use in electronic message transmission systems of the type having a base station unit and at least one mobile unit comprising:

a base unit microprocessor code memory;

15. A method for transmitting identification codes for electronic message transmission systems of the type having a base unit, with electronic memory, and one or more mobile units, with electronic memory, comprising:

selecting an identification code in said base unit;

replacing any existing identification codes in said base unit memory; and copying the identification code from the base unit to the mobile unit by means of Hall effect and magnetic flux detection.

16. A method as defined in claim 15 further comprising selecting a random number as said identification code.

17. A method as defined in claim 15 further comprising using a Hall effect transistor to magnetically receive said identification code.

18. An encoding system for use in an electronic message transmission system of the type having a base unit and one or more mobile units comprising:

an identification code generator;

a base unit having an electronic memory for storing said identification code;

a magnetic field generator for transmitting said identification code to said mobile unit, and a Hall effect detector for receiving said identification code in said mobile unit.

* * * * *